April 14, 1925.
B. S. HUGHES
SEPARATOR
Filed Dec. 8, 1920
2 Sheets-Sheet 1
1,533,501
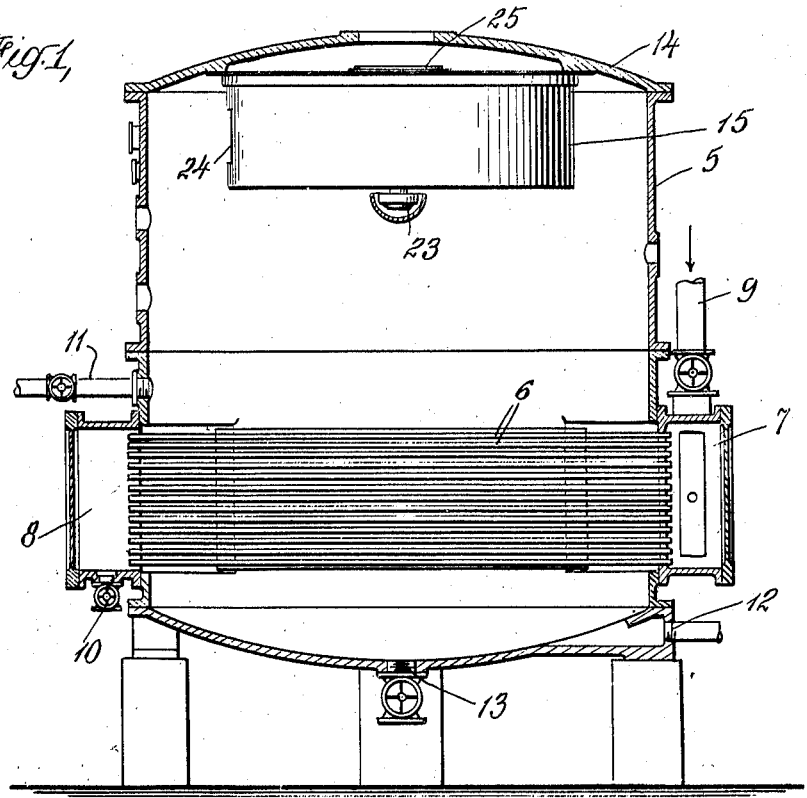
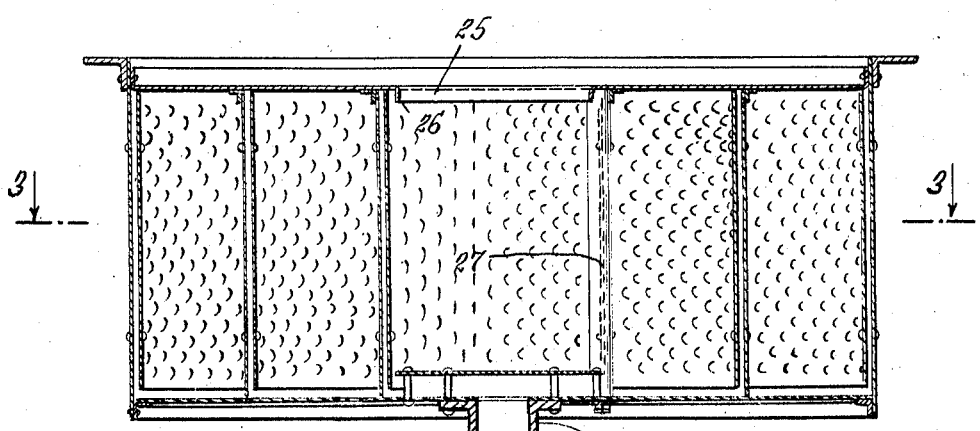
INVENTOR
Burton S. Hughes
BY
Pennie Davis Marvin & Edmonds
his ATTORNEYS April 14, 1925.  1,533,501
B. S. HUGHES
SEPARATOR
Filed Dec. 8, 1920  2 Sheets-Sheet 2

INVENTOR
Burton S. Hughes
BY
Pennie Davis Marvin & Edmonds
his ATTORNEYS

Patented Apr. 14, 1925.

1,533,501

UNITED STATES PATENT OFFICE.

BURTON S. HUGHES, OF BUFFALO, NEW YORK, ASSIGNOR TO ZAREMBA COMPANY, OF BUFFALO, NEW YORK, A CORPORATION OF MAINE.

SEPARATOR.

Application filed December 8, 1920. Serial No. 429,071.

*To all whom it may concern:*

Be it known that I, BURTON S. HUGHES, a citizen of the United States, residing at Buffalo, in the county of Erie, State of New York, have invented certain new and useful Improvements in Separators; and I do hereby declare the following to be a full, clear, and exact description of the invention, such as will enable others skilled in the art to which it appertains to make and use the same.

This invention relates to the separation of finely divided particles of liquid from vapors, particularly in evaporators which otherwise, because of foaming or entrainment of the liquid being evaporated with the vapors produced, frequently permit quantities of the liquid to escape with resulting decreased efficiency and frequent loss of valuable material.

Numerous separating devices have been heretofore suggested, involving the use of collecting plates, baffles and the like, and even of means which, by causing a whirling movement of the vapor, result in throwing the entrained liquids against a wall upon which it is condensed and collected. Such devices have not, however, been markedly successful, because of failure to appreciate certain fundamental requirements and necessary limitations of an apparatus for the purpose described.

An object of the present invention is the provision of an evaporator constructed and arranged to successfully separate entrained liquid from the vapor produced therein, and to return the liquid to the main body thereof undergoing evaporation, whereby all loss of liquid is prevented and the annoyance and waste heretofore resulting in the operation of evaporators is overcome.

A further object of the invention is the provision of a device for separating liquids from vapors having certain novel characteristics as will hereinafter appear, and adapted to rapidly and efficiently separate large volumes of entrained liquid from vapors passing therethrough.

Figure 3:
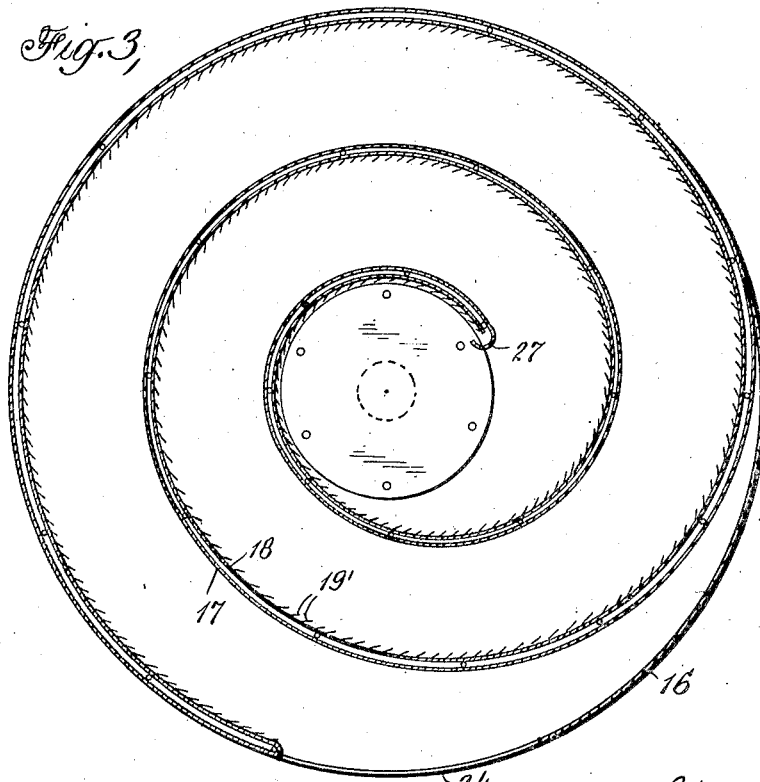
Figure 4:
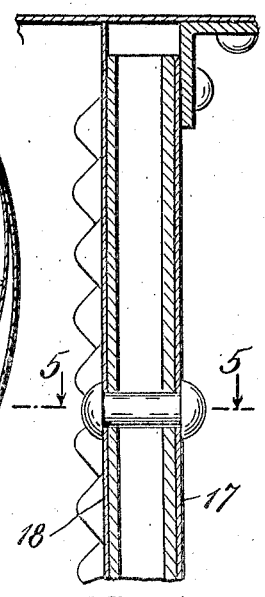
Figure 6:
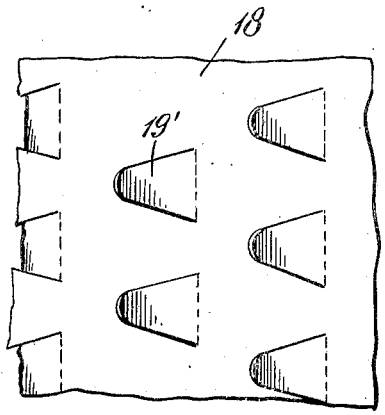
Figure 5:
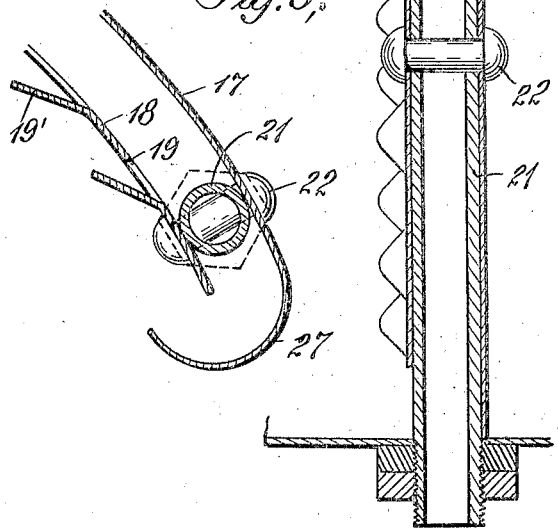

Further objects and advantages of the invention will be apparent as it is better understood by reference to the following specification and accompanying drawing, in which Fig. 1 is a vertical section through an evaporator with the separator installed therein; Fig. 2 is a vertical section through the separator; Fig. 3 is a section on the line 3—3 of Fig. 2; Fig. 4 is an enlarged detail in section on the wall of the separator-passage; Fig. 5 is a section on the line 5—5 of Fig. 4; and Fig. 6 is a detail in elevation illustrating the tongues on the separator-passage wall.

To illustrate the need for a device of the character herein claimed, it may be noted that many solutions which are evaporated in commercial practice, particularly those of a soapy nature, foam violently when boiling, especially when boiling under vacuum as in the usual evaporator. No effective means has heretofore been devised which would prevent the escape of the foam from the evaporator, and much valuable liquid has thus been lost. It is possible to reduce foaming as by keeping the surface of the liquid in the evaporator covered with oil, or by permitting the liquid to cover only a portion of the heating surface, the remainder of which is used to superheat and thus break up the foam. Both of these expedients result in increased costs. Neither expedient is satisfactory and is employed merely because of lack of better means for accomplishing the desired result.

The present invention is adapted to meet the necessity described in every respect. Briefly it involves the provision of a spiral passageway for the vapor and entrained liquid, the wall of which is formed of two sheets slightly separated, the inner sheet being provided with a multitude of perforations with a tongue punched out of the metal and projecting slightly at the side of each perforation. The passageway is housed within a casing, which is provided with an inlet and an outlet for the vapor and trapped drains for the moisture which is thrown against the outer wall of the passageway by centrifugal force equivalent to two to four hundred times that of gravity. The minute particles of liquid are caught by the tongues and carried through the perforations into the space between the walls, whence it drains to the traps and is returned to the liquid body being evaporated.

In carrying out the invention, the separator is preferably arranged within the shell of the evaporator, which may be of any type in which the required space is provided. The advantage of this arrangement is that the casing of the separator, being subjected to substantially equal pressures externally and internally, need not be so heavily constructed as is otherwise necessary to withstand the external pressure resulting from the maintenance of a partial vacuum therein. Another advantage is that no piping is required to return the liquid to the evaporator, a matter of considerable importance, particularly in large evaporators which, when foaming badly, may require the returning of several hundred gallons of liquid per minute. In installations of the size now in common use, this is of material importance and represents considerable saving in the cost of the separator.

The separator may, however, be of the external type, and such a type is well adapted for certain uses, particularly where it is impracticable to introduce the separator to the evaporator, or when it is used in separating liquids from vapors which are formed in apparatus other than standard forms of evaporators.

Referring to Fig. 1 of the drawing illustrating the preferred application of the invention, 5 indicates the shell of the evaporator, having heating tubes 6, terminating in a steam chest 7 and outlet box 8 respectively. Steam is admitted through an inlet 9 and the condensate escapes through a drain 10. The liquor to be evaporated is supplied through an inlet 11, and an outlet 12 and washout drain 13 are provided. The liquor is maintained in the shell at a level above the tubes 6 and space is provided for the vapor above the level of the liquor.

Supported preferably on the top 14 of the shell, although the mode of support will vary with the type and size of the evaporator, is the separator 15, which is illustrated in detail in Figs. 2 to 6 inclusive of the drawing. Preferably, the separator is cylindrical in form and consists of a light metal casing 16, formed by the outer convolution of the spirally disposed wall which provides the passageway for the vapor with top and bottom covers to provide an enclosed passage. The spiral wall consists of two sheets 17 and 18, the inner of which, having reference to the passage, is imperforate, while the outer wall is provided with a multitude of perforations 19, each having a tongue 19' so struck out of the metal and projecting at an angle to the face of the sheet as indicated in Figs. 5 and 6. The tongues are preferably roughly triangular in form and rounded at the point, and project only slightly from the sheet to reduce frictional losses in passing the vapor through the passage. The two walls 17 and 18 are held in spaced relation by spacers 21 and rivets 22. As shown in Fig. 4 the sheet 17 extends from the top to the bottom of the separator so as to prevent the transverse communications between the convolutions of the spiral passage. This is necessary because there is always a slight difference in pressure between the inlet and outlet of the separator and the presence of opening would permit a portion of the vapor to pass through the separator without traveling through the spiral passage. The space between the plates forming a channel through which the liquid separated from the vapor, may drain to the bottom of the separator where it flows into one or more traps, each consisting of a depending neck 22' and a bowl 23. The liquid overflows from the bowl into the evaporator. The trap is necessary because of slight pressure differences between the interior and exterior of the separator, which would otherwise cause the vapor to enter through the liquid outlet. The vapor entering through the inlet 24, after passing through the spiral passageway where the liquid is separated, escapes through an outlet 25 from the separator and evaporator.

A depending lip 26 is provided around the outlet 25 to prevent the ascending vapor from carrying away any liquid on the adjacent surface of the perforated wall. Similarly, a curved lip 27 at the inner end of the spiral wall prevents the carrying of liquid from the adjacent surface thereof.

Obviously the proportions of the separator must be particularly designed to fit the requirements of the evaporator, both as to shape and dimensions, depending upon the required capacity, which is influenced by the character of the liquid being evaporated. Any number of convolutions may be provided to secure the desired results, and the vapor may enter at the outer or inner end of the spiral passageway and travel in either direction therein.

Preferably, however, the vapor enters the inlet 24 as noted. The path of the vapor in the spiral passageway is curved, and it travels at high velocity, thus developing centrifugal force, which causes the heavier liquid to travel outwardly until it contacts with the outer perforated wall. The minute particles are caught by the projecting tongues, deflected through the perforations and consolidated into a film of liquid which is forced through the perforations into the space between the walls. Thence it trickles down to the bottom of the separator and drains through the trap.

When the evaporator is foaming badly, the mass of bubbles of varying sizes and with films of varying thickness enters the separator and travels through the spiral passage-way at high velocity. The foam is pressed against the surface of the outer perforated wall and the bubbles are scrubbed by the projecting tongues. The bubbles are broken and reduced to a liquid film, which is forced through the perforations in the plate and returned to the body of liquid in the evaporator through the trap.

From the foregoing, it will be observed that a simple and relatively inexpensive improvement in evaporators has been provided, which is capable in spite of its simplicity, of marked advantage in the evaporation of liquids. Heretofore, the problem of preventing escape of liquids from evaporators has engaged the attention of many persons skilled in this art, but no successful solution of the problem has been advanced. Practical application of the present invention has, however, fully demonstrated its advantages and the ease with which vapors, particularly such as carry foam, may be delivered in a condition substantially free from liquid, while the full capacity of the evaporator is utilized and without the aid of oil or other anti-foaming expedients.

I claim:

1. In a foam separator to remove entrained liquid from vapor, the combination of top and bottom walls, spaced walls to form a spiral passage terminating at an inlet and an outlet, the inner wall of the passage extending from the top to the bottom wall to prevent transverse communication between the convolutions of the passage and having a curved lip at the outlet end of the passage to prevent entrainment of liquid, the outer wall of the passage being perforated and having a plurality of tongues projecting in the path of the vapor in the passage.

2. In a foam separator to remove entrained liquid from vapor, the combination of top and bottom walls, spaced walls arranged to form a spiral passage terminating at an inlet and an outlet, the inner wall of the passage extending from the top to the bottom wall to prevent transverse communication between the convolutions of the passage, the outer wall of the passage being perforated and having a plurality of tongues projecting into the path of the vapor in the passage and the top having an opening through which the vapor escapes and a depending lip to prevent escape of liquid from the adjacent wall.

In testimony whereof I affix my signature.

BURTON S. HUGHES.